(12) United States Patent
Rayzman et al.

(10) Patent No.: US 7,966,037 B2
(45) Date of Patent: Jun. 21, 2011

(54) METHOD AND APPARATUS FOR MULTI-RADIO TRAFFIC ARBITRATION IN WIRELESS COMMUNICATION PROTOCOLS

(75) Inventors: Giora Rayzman, Rishon-LeZion (IL); Oren Kaidar, Binyamina (IL); Miri Ratner, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 1058 days.

(21) Appl. No.: 11/803,957

(22) Filed: May 16, 2007

(65) Prior Publication Data
US 2008/0287158 A1    Nov. 20, 2008

(51) Int. Cl.
*H04W 88/00* (2009.01)
*H04B 1/38* (2006.01)
(52) U.S. Cl. .......... 455/552.1; 455/517; 455/556.1; 455/41.2; 455/553.1
(58) Field of Classification Search .......... None
See application file for complete search history.

(56) References Cited

U.S. PATENT DOCUMENTS

| | | | | |
|---|---|---|---|---|
| 7,117,008 | B2* | 10/2006 | Bajikar | 455/552.1 |
| 7,313,547 | B2* | 12/2007 | Mocek et al. | 705/51 |
| 7,406,296 | B2* | 7/2008 | Haartsen | 455/41.2 |
| 7,468,963 | B2* | 12/2008 | Capretta | 370/329 |
| 2007/0098004 | A1* | 5/2007 | Lada | 370/437 |
| 2007/0223430 | A1* | 9/2007 | Desai et al. | 370/338 |

* cited by examiner

*Primary Examiner* — Philip J Sobutka
(74) *Attorney, Agent, or Firm* — Cool Patent, P.C.; Joseph P. Curtin

(57) ABSTRACT

A method and apparatus of coordinating operation of subsystems implementing different wireless communication protocols is disclosed. The method comprises coordinating operation of a first subsystem implementing a first wireless communication protocol and at least other subsystem implementing at least one other wireless communication protocol by arbitrating between conflicting real time requests for access from the first subsystem and the at least one other subsystem based on a respective type and priority of the requests.

23 Claims, 3 Drawing Sheets

METHOD AND APPARATUS FOR MULTI-RADIO TRAFFIC ARBITRATION IN WIRELESS COMMUNICATION PROTOCOLS

FIELD OF THE INVENTION

The present invention relates generally to concurrent operation of wireless communication protocols used by wireless communication devices. In particular, the invention relates to the concurrent operation of multiple subsystems employing two or more wireless communication protocols, such as, but not limited to, WiMAX, Bluetooth and Wi-Fi.

BACKGROUND OF THE INVENTION

There is a range of wireless communications protocols in use by the subsystems of wireless communication devices, such as mobile telephones, personal digital assistants (PDAs), mobile internet devices and laptop computers. Examples of such protocols include the Institute of Electrical and Electronics Engineers (IEEE) 802.16 standard family of communication protocols, commonly referred to as WiMAX (Worldwide Interoperability for Microwave Access), Bluetooth and the IEEE 802.11 standard family commonly referred to as Wi-Fi. Two or more of the communications protocols are often in use simultaneously between multiple devices. The subsystems of the devices may require instantaneous access to the air medium and/or access to one or more shared resources or may pre-schedule access ahead of time. To reduce interference between the subsystems implementing the different wireless communication protocols and thus maintain data transfer rates and avoid compromising the quality of service, such as degrading voice quality in voice calls, coexistence protocols are employed.

There are currently priority based real-time for the coexistence between Wi-Fi and Bluetooth, but there are no such solutions for such coexistence between WiMAX and Bluetooth or between multiple wireless communication protocols, such as combinations of Wi-Fi, WiMAX, Bluetooth, or third-party radio technologies.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein.

Figure 1:
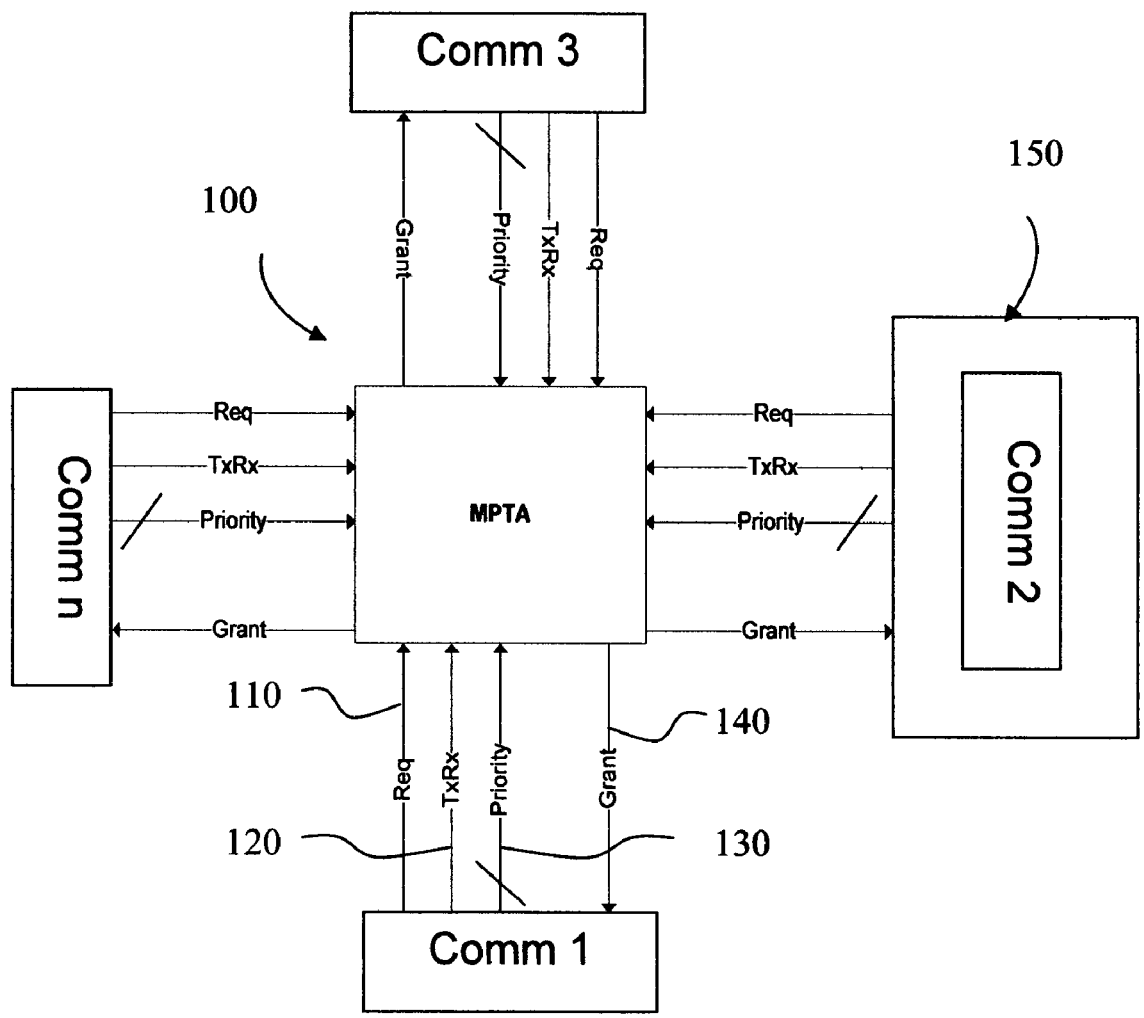
FIG. 1 is a schematic diagram illustrating an apparatus for coordinating operation of two or more subsystems implementing different wireless communication protocols according to an embodiment of the invention.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to coordinating operation of two or more subsystems implementing different wireless communication protocols. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of coordinating operation of two or more subsystems implementing different wireless communication protocols as herein described. The non-processor circuits may include, but are not limited to, a radio receiver, a radio transmitter, signal drivers, clock circuits, power source circuits, and user input devices. As such, these functions may be interpreted as a method for coordinating operation of two or more subsystems implementing wireless communication protocols. Alternatively, some or all functions could be implemented by a state machine that has no stored program instructions, a configurable state machine having flexible implementation, or in one or more application specific integrated circuits (ASICs), Field-Programmable Gate Arrays (FPGAs), Complex Programmable Logic Devices (CPLDs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

With reference to FIG. 1 and in accordance with embodiments of the present invention, a schematic diagram illustrates an apparatus for coordinating operation of two or more subsystems implementing different wireless communication protocols. Embodiments of the present invention can be implemented in, and are applicable to, wireless communication devices, such as, but not limited to, mobile telephones, notebook or laptop computers, personal digital assistants (PDAs), portable multimedia devices, mobile internet devices (MIDs), ultra mobile PCs (UMPCs), ultra mobile devices (UMDs) and other wireless communication devices.

According to some embodiments of the present invention, the apparatus comprises an arbitration module 100 in the form of a Multi-radio Priority-based Traffic Arbitration (MPTA) unit. As illustrated, the arbitration module 100 can be in communication with one or more of a plurality of wireless communication subsystems Comm 1, Comm 2, Comm 3, . . . , Comm n. Each subsystem implements a wireless communication protocol, such as, but not limited to, WiMax, Wi-Fi, Bluetooth, protocols used in radio navigation systems, such as GPS, GLONASS and Galileo, other third party vendor radio technologies and the like. Whilst FIG. 1 illustrates each subsystem provided in separate wireless communication devices, it will be appreciated that multiple subsystems can be provided in a single wireless communication device, such as, but not limited to, the aforementioned wireless communication devices.

Each subsystem Comm 1, Comm 2, Comm 3, . . . , Comm n, is configured to generate a signal comprising a request indicator 110 (Req), which indicates an active request from the subsystem for access to the air medium and/or access to one or more shared resources. Each subsystem also generates an associated type indicator 120 (TxRx), which indicates the type of function being requested, i.e., whether the request is for transmission or reception. Each subsystem also generates an associated priority indicator 130, which indicates the importance of the request. For example, a request for air medium access for a Voice over Internet Protocol (VoIP) call typically has a higher priority than a request for air medium access for other data transmission or reception. The priority indicator can be single-bit indicating a high or low priority or may be multibit allowing a broader range of priorities rather than just high or low. Each subsystem is responsible for its own priority determination. According to some embodiments, the request indicator 110, type indicator 120 and priority indicator 130 are maintained for the duration of the transmission or reception of the particular function. In other embodiments, the arbitration module 100 can store a last state in memory and another signal, which is triggered when the state is changed by the corresponding subsystem. As an alternative to the additional signal, in some embodiments, a specific pattern can be generated, for example, in the request signal before setting the new status of the corresponding signal.

As described in further detail hereinafter, FIG. 1 also shows the arbitration module 100 transmitting grant signals 140 to the subsystems Comm 1, Comm 2, Comm 3, . . . , Comm n indicating grant or denial of the requests of the respective subsystems. According to some embodiments, the arbitration module 100 maintains the level of the grant signals for the duration that the grant signal is valid. Alternatively, memory based signalling can be employed as described above.

It should be appreciated that situations can occur in which one or more of the subsystems implement, or are capable of implementing, known coexistence solutions, such as a 2-wire or 3-wire Bluetooth-Wi-Fi coexistence interface or the like. Such legacy solutions are accommodated by embodiments of the present invention by the provision of transformational glue logic 150 between one or more of the subsystems and the arbitration module 100. As an example, FIG. 1 shows the transformational glue logic 150 provided in association with subsystem Comm 2, but the transformational glue logic can be provided in association with any one or more of the subsystems Comm 1, Comm 2, Comm 3, . . . , Comm n. The glue logic can be implemented in the form of, for example, one or more CPLDs or FPGAs. Referring to FIG. 1, the transformation glue logic in this embodiment is in the form of a real-time requests complex 150. According to such embodiments, the real-time access requests from the communication subsystem Comm 2, can be considered to originate from the real-time requests complex 150.

The method 200 of coordinating operation of a first subsystem Comm 1 implementing a first wireless communication protocol and at least one other subsystem, Comm 2, Comm 3, . . . , Comm n, implementing at least one other wireless communication protocol according to some embodiments of the present invention will now be described with reference to the flow diagram in FIG. 2. Coordinating operation of multiple subsystems implementing different wireless communication protocols comprises arbitrating between conflicting real-time requests for access from the first subsystem and the at least one other subsystem based on a respective type and priority of the requests.

At 210, the method 200 comprises one of the subsystems initiating a request 110 (Fi REQ) for access to the air medium and/or access to one or more shared resources. The request includes its corresponding transmission or reception indicator 120 and corresponding priority indicator 130. At 220, the method 200 comprises determining whether the request is active by checking that the REQ is asserted. If the request is not active, access will not be granted at 230.

The method further comprises at 240 determining whether a conflict exists between simultaneous requests for access by comparing the requests with a conflict identification store, such as a look-up table stored in memory. Comparison of the requests includes comparing the transmission or reception indicators 120 of the requests. For example, simultaneous requests for reception from two or more subsystems Comm 1, Comm 2, Comm 3, . . . , Comm n may be permitted in which, if granted, the granted requests would not share common resources, such as an antenna. Conversely, transmission from one subsystem implementing a first wireless communication protocol that is known to cause radio interference with reception by a second wireless communication protocol implementing a second wireless communication protocol will generate a conflict.

According to some embodiments, radio functions can be enabled or disabled in the conflict identification store. A request for a disabled function will not be considered when determining whether a conflict exists.

According to some embodiments, the conflict identification store can be configurable a priori or automatically when the device in which embodiments of the present invention are implemented moves from one country or regulatory domain to another. For example, the frequency band in which some wireless communication protocols operate differ between countries or regulatory domains. Therefore, simultaneous requests for access from subsystems implementing different wireless communication protocols may not generate a conflict in one country or regulatory domain, but may generate a conflict in another country or regulatory domain. Automatic configuration of the conflict identification store upon entering a new country or regulatory domain ensures that true conflicts are identified and that false conflicts are not erroneously identified. Furthermore, automatic configuration of the conflict identification store avoids the need for user intervention. However, user intervention can be permitted to, for example, enable the user to change the rules in accordance with the set of applications that the user wishes to use.

Figure 2:
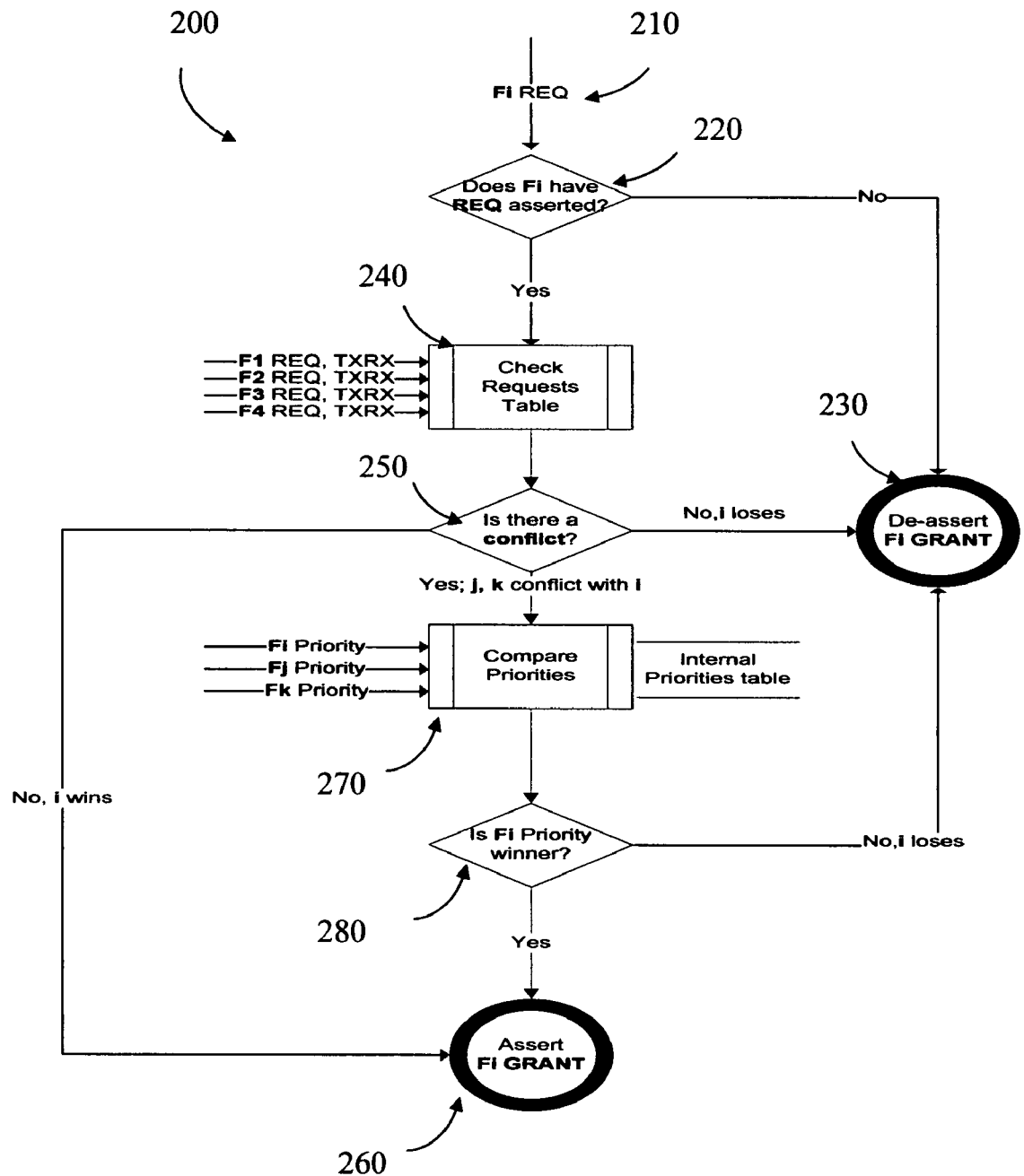
FIG. 2 is a flow diagram illustrating a method for coordinating operation of two or more subsystems implementing different wireless communication protocols according to another embodiment of the invention.

With reference to 250 of the method in FIG. 2, when a request Fi does not generate a conflict with another request, the request can be granted at 260. Alternatively, even if there is no conflict, access may be denied at 230 if some other circumstance prevails.

Where the request Fi conflicts with one or more other requests for access, such as requests Fj and Fk in the example shown in FIG. 2, there can be one or more potential candidate subsystems to which access can be granted. In this case, the method 200 further comprises at 270 comparing the priorities of the requests Fi, Fj and Fk via the priority indicators of each request. At 280, if the priority of the request Fi is the highest, the method comprises granting access at 260 to the subsystem from which the request originated via a grant signal. According to some embodiments, if the request Fi does not have the highest priority, access will be denied at 230.

The priority indicator of the request can relate to the function for which access is being requested. For example, according to some embodiments, a request for access to establish a voice link can have a higher priority than a request for access to establish a data link, for example, to transfer a data file. A hierarchy of the priorities is specified in a priority store, such as a priority look-up table. The priority store can be configurable a priori or in run time.

According to some embodiments, the priority indicator can relate to the wireless communication protocol implemented by the subsystem initiating the request. In this case, the method comprises comparing the priority indicator of the request with a priority hierarchy for a plurality of wireless communication protocols stored in memory, for example in a look-up table. According to some embodiments, access is granted at 260 to the request having the highest wireless communication protocol priority. For example, a hierarchy of wireless communication protocols can include third-party-vendor radio technologies having a higher priority than WiMAX, which has a higher priority than Bluetooth, which in turn has a higher priority than Wi-Fi. Other hierarchies of wireless communication protocols are, of course, possible. The stored hierarchy can be configured a priori or in run time.

According to some embodiments, the priorities based on wireless communication protocols can be used for comparison as an alternative, or in addition to, the priorities based on the functions of the requests. For example, the method can further comprise granting access to the request from the subsystem implementing the wireless communication protocol highest in the hierarchy in which priorities based on the functions of the requests are equal.

Once access has been granted to a subsystem at 260, the air medium and/or the one or more shared resources can be used by the subsystem until the grant signal is deactivated. The method can comprise one of the subsystems acquiring access upon deactivation of the grant signal to another subsystem. The subsystem that does not have access can seize transmission or reception access or access to one or more shared resources immediately following deactivation of the grant signal to another subsystem via immediate or deferred media release, even at the expense of dropping the current transmission, burst, packet or protocol data unit (PDU).

According to various embodiments of the present invention, the wireless communication protocols can include two or more of the following: WiMax, Bluetooth, Wi-Fi, protocols implemented in navigation systems, such as GPS, GLONASS and/or Galileo, third-party-vendor radio technologies. Hence, embodiments of the present invention include the advantages of providing coexistence solutions between Wi-Fi and Bluetooth, between WiMAX and Bluetooth and between more than two simultaneously operating wireless communication protocols, such as Wi-Fi, Bluetooth and WiMAX. Furthermore, embodiments of the present invention enable the addition of third-party-vendor radio technologies that conventionally may interfere with one or more of the Wi-Fi, Bluetooth and/or WiMAX protocols providing a suitable interface for the third-party-vendor radio technologies is implemented. In this regard, transformational glue logic in the form of the real-time requests complex can be provided to interface with one or more of the subsystems implementing legacy coexistence and/or arbitration protocols.

Embodiments of the present invention allow the sharing of one or more resources, such as RF components and antennae, between subsystems implementing different wireless communication protocols, thus reducing the bill of materials (BOM) of the solution. Embodiments of the present invention allow the extension of existing standard and proprietary interfaces thus enabling the straightforward adaptation of existing radio technologies. Embodiments of the present invention can be extended to include logic that enables switching between shared resources, such as antennae switching.

Figure 3:
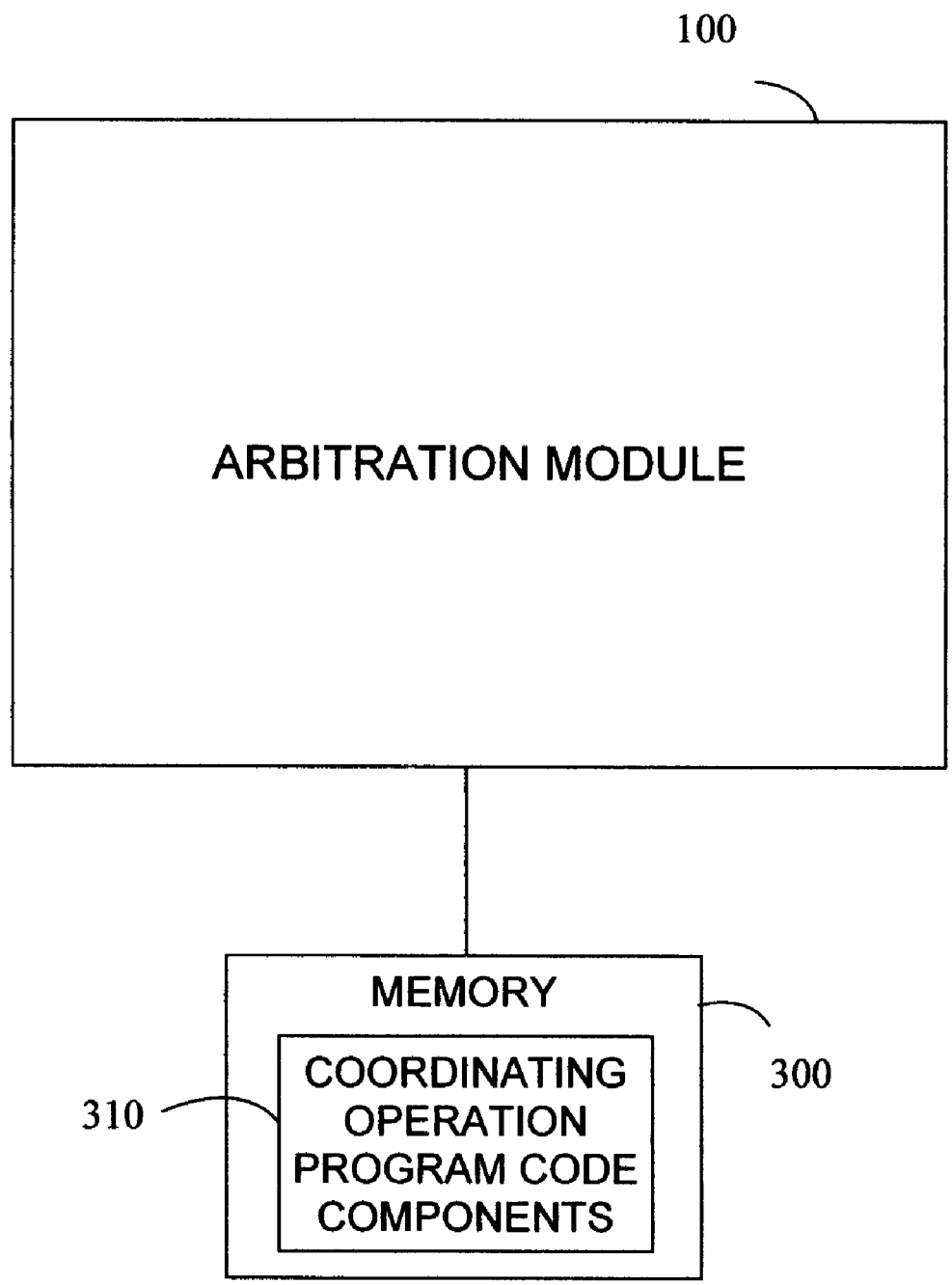
FIG. 3 is a schematic diagram illustrating components of the apparatus shown in FIG. 1 according to some embodiments of the present invention.

As described above, embodiments of the present invention can be implemented by a state machine that has no stored program instructions, or in one or more ASICs, FPGAs, CPLDs, or other dedicated circuitry, in which each function or one or more combinations of the functions are implemented as custom logic. With reference to FIG. 3, some embodiments of the present invention can alternatively or additionally comprise a storage medium in the form of a memory 300 operatively coupled to the arbitration module 100. The memory 300 comprises a computer-readable medium, such as a random access memory (e.g., static random access memory (SRAM), or synchronous dynamic random access memory (SDRAM)), read only memory (e.g., programmable read only memory (PROM), or electrically erasable programmable read only memory (EEPROM)), or hybrid memory (e.g., FLASH), flip-flop array, register set or other types of memory suitable for this type of storage, as is well known in the art. The computer-readable medium comprises computer-readable program code components 310 for coordinating operation of subsystems Comm 1, Comm 2, Comm 3, . . . , Comm n, implementing different wireless communication protocols in accordance with the teachings of the present invention, at least some of which are selectively executed by the arbitration module 100 and are configured to cause the execution of the method described herein.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:
1. A method, comprising:
receiving a real-time request from a first system for access to an air medium, at least one shared resource, or combinations thereof, the real-time request comprising a type indicator and a priority indicator; and
coordinating operation of the first subsystem implementing a first wireless communication protocol and at least one other subsystem implementing at least one other wireless communication protocol by arbitrating between conflicting real-time requests for access to the air medium, the at least one shared resource, or combinations thereof, received from the first subsystem and the at least one other subsystem based on a respective type and priority of the requests.

2. The method of claim 1, further comprising granting access to the request with the highest priority.

3. The method of claim 1, further comprising comparing the priority of the requests with a priority hierarchy for a plurality of wireless communication protocols.

4. The method of claim 1, further comprising comparing the priority of the requests with a priority hierarchy for a function of the requests.

5. The method of claim 1, further comprising granting access to the request from the subsystem implementing the wireless communication protocol highest in the hierarchy where priorities based on a function of the requests are equal.

6. The method of claim 1, wherein the first and the at least one other wireless communication protocols include at least two of the following: WiMax, Bluetooth, Wi-Fi, navigation protocols, third-party-vendor radio technology protocols.

7. The method of claim 1, further comprising one of the subsystems acquiring access upon deactivation of a grant of access to another subsystem.

8. The method of claim 1, further comprising determining whether a conflict exists between the real-time request received from the first subsystem and a real-time request received from at least one other subsystem for access to the air medium, the at least one shared resource, or combinations thereof, by comparing the real-time request received from the first subsystem with a conflict identification store, the conflict identification store comprising the type indicator and the priority indicator for each received real-time request.

9. The method of claim 1, further comprising interfacing with one or more of the subsystems with transformational glue logic where the one or more subsystems implement legacy coexistence and/or arbitration protocols.

10. The method of claim 3, 4 or 8, further comprising configuring the priority hierarchy and/or the conflict identification store a priori and/or in run time.

11. An article, comprising: a non-transitory computer-readable medium having stored thereon instructions that, if executed, result in at least the following:
receiving a real-time request from a first system for access to an air medium, at least one shared resource, or combinations thereof, the real-time request comprising a type indicator and a priority indicator; and
coordinating operation of the first subsystem implementing a first wireless communication protocol and at least one other subsystem implementing at least one other wireless communication protocol by arbitrating between conflicting real-time requests for access to the air medium, the at least one shared resource, or combinations thereof, received from the first subsystem and the at least one other subsystem based on a respective type and priority of the requests.

12. The article of claim 11, further comprising granting access to the request with the highest priority.

13. The article of claim 11, further comprising comparing the priority of the requests with a priority hierarchy for a plurality of wireless communication protocols.

14. The article of claim 11, further comprising comparing the priority of the requests with a priority hierarchy for a function of the requests.

15. The article of claim 11, further comprising granting access to the request from the subsystem implementing the wireless communication protocol highest in the hierarchy where priorities based on a function of the requests are equal.

16. The article of claim 11, wherein the first and the at least one other wireless communication protocols include at least two of the following: WiMax, Bluetooth, Wi-Fi, navigation protocols, third-party-vendor radio technology protocols.

17. The article of claim 11, wherein one of the subsystems acquires access upon deactivation of a grant of access to another subsystem.

18. The article of claim 11, further comprising determining whether a conflict exists between the real-time request received from the first subsystem and a real-time request received from at least one other subsystem for access to the air medium, the at least one shared resource, or combinations thereof, by comparing the real-time request received from the first subsystem with a conflict identification store, the conflict identification store comprising the type indicator and the priority indicator for each received real-time request.

19. The article of claim 13, 14 or 18, wherein configuration of the priority hierarchy and/or the conflict identification store a priori and/or in run time.

20. A processor to coordinate operation of a first subsystem implementing a first wireless communication protocol and at least one other subsystem implementing at least one other wireless communication protocol by receiving a real-time request from the first system for access to an air medium, at least one shared resource, or combinations thereof, the real-time request comprising a type indicator and a priority indicator; and arbitrating between conflicting real-time requests for access received from the first subsystem and the at least one other subsystem based on a respective type and priority of the requests.

21. The processor of claim 20, further comprising transformational glue logic to interface with one or more of the subsystems implementing legacy coexistence and/or arbitration protocols.

22. The processor of claim 21, wherein the processor coordinates operation by further determining whether a conflict exists between the real-time request received from the first subsystem and a real-time request received from at least one other subsystem for access to the air medium, the at least one shared resource, or combinations thereof, by comparing the real-time request received from the first subsystem with a conflict identification store, the conflict identification store comprising the type indicator and the priority indicator for each received real-time request.

23. The processor of claim 20, wherein the processor coordinates operation by further determining whether a conflict exists between the real-time request received from the first subsystem and a real-time request received from at least one other subsystem for access to the air medium, the at least one shared resource, or combinations thereof, by comparing the real-time request received from the first subsystem with a conflict identification store, the conflict identification store comprising the type indicator and the priority indicator for each received real-time request.

* * * * *